# United States Patent Office 2,724,969
Patented Nov. 29, 1955

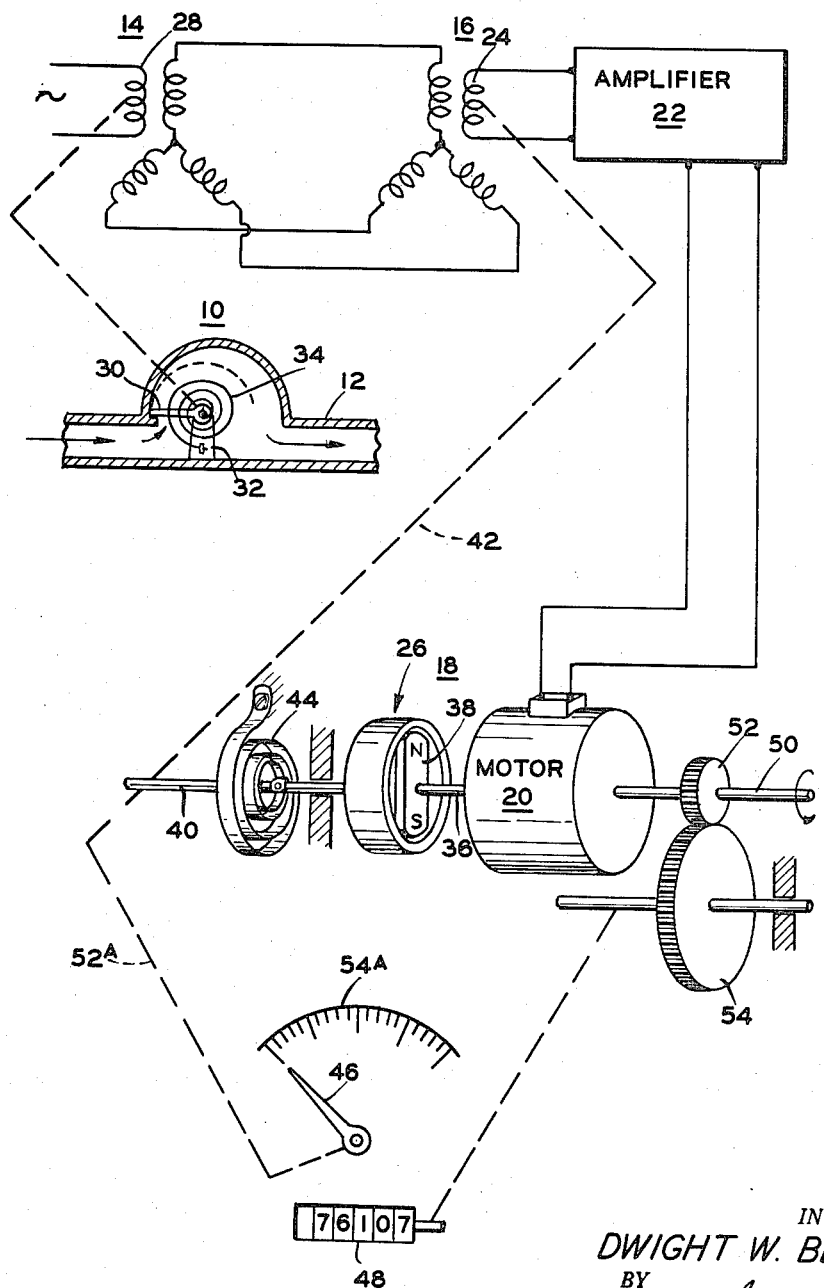

2,724,969
FLUID FLOW INDICATING APPARATUS

Dwight W. Bloser, Oradell, N. J., assignor to Bendix Aviation Corporation, Teterboro, N. J., a corporation of Delaware Application February 11, 1950, Serial No. 143,808

8 Claims. (Cl. 73—228)

The present invention relates to indicating systems and more particularly to a system for continuously indicating rate and/or for integrating a rate function to derive therefrom an indication of quantity.

Information as to the rate of fuel consumption and/or the quantity of fuel remaining is particularly vital on aircraft. Various systems have been proposed in the past for conveying such information to the pilot or the engineer. In one such system the fuel consumption was approximated by periodically determining the rate of fuel flow and then averaging this over the period between such determinations. Besides requiring rather complex apparatus, this method will, of course, only give an approximation of the fuel consumed, the accuracy depending on how often such determinations are made and how constant the fuel flow is. The present invention contemplates the provision of a novel system for continuously indicating at a remote point the rate of fuel consumption and/or the quantity of fuel consumed or fuel remaining in the fuel tanks of the craft.

Accordingly, one object of the present invention is to provide a novel and simple device for continuously indicating the rate of fluid flow.

Another object is to provide a novel and simple device for integrating a rate function to derive therefrom an indication of quantity.

Another object is to provide a novel and simple device for continuously indicating the rate of fluid flow through a conduit and the quantity of fluid having passed therethrough.

Still another object is to provide a novel system for continuously indicating at a remote point the rate of fuel flow through a fuel line and the quantity of fuel consumed.

Still another object is to provide means for operating a variable speed motor at a speed proportional to the position of a rate responsive device to position an indicator through a drag coupling and to provide an indication of quantity by integrating the speed of the motor over the period it has been operating.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

The single figure of the drawing illustrates schematically one embodiment of the invention as applied to the fuel system of an aircraft. The system illustrated comprises generally a condition responsive device such as a flow meter 10 positioned by the flow in fuel line 12 to actuate transmitting means 14 for transmitting a signal as a function of the position of the flow meter to a receiver 16, connected thereto, and means generally indicated at 18 including a motor 20 connected to the receiver through an amplifier 22 adapted to position a movable rotor 24 of the receiver in a direction toward angular positional agreement with rotor 28 tending to decrease toward zero the received signal appearing across the winding of rotor 24, the motor being coupled to rotor 24 through a slip coupling indicated at 26.

Transmitter 14 and receiver 16 may be inductive devices having the stators thereof connected back to back. Rotor 28 of transmitter 14 is positioned by flow meter 10 which may be of any convenient type. For the sake of illustration, there is shown a vane type flow meter comprising a vane 30 pivotally mounted on a support 32 and adapted to swing along an arc indicated by the dotted line under force of fuel passing through the line. In the position shown, the vane will effectively close off the line and is biased toward this position by a hair spring 34. As soon as fuel begins to flow, the vane will be displaced from this initial position by an angle proportional to the rate of fuel flow through the line because the casing of the meter is eccentric with respect to the path of the vane, as shown, to provide an opening between the vane and the casing proportional to the angular displacement of the vane.

Rotor 28 may be connected to vane 30 by a mechanical linkage or the transmitter may be secured to the casing of the flow meter so that the rotor may be mounted directly on the shaft of the vane and be movable therewith. The rotor is excited from a convenient source of A. C. power.

Rotor 24 of receiver 16 is connected to an amplifier 22 and the rotor is adjusted so as to have zero output when there is no flow through conduit 12 and the vane is positioned as shown in the drawing. The output of amplifier 22 is connected to motor 20 having a double ended output shaft, of which one end 36 is connected to the input end 38 of slip coupling 26 here illustrated as a magnetic drag cup. Output shaft 40 of the slip coupilng may be connected to rotor 24 through a mechanical linkage indicated at 42 or it may be found convenient to mount rotor 24 directly on shaft 40. A hair spring 44 is attached to shaft 40 and is arranged to bias it in such a direction as to return rotor 24 to zero position when motor 20 stops.

An indicator 46 may be connected to shaft 40 or to rotor 24 in order to indicate the position thereof. A counter 48 is shown as being driven from the other end 50 of the shaft of motor 20 through reduction gears 52, 54.

As long as there is no flow through line 12, vane 30 of flow meter 10 will remain in the position shown in the drawing and no signal will appear across rotor 24 of receiver 16. A flow through the line will displace vane 30 and hence rotor 28 of transmitter 14. Correspondence between transmitter 14 and receiver 16 having been destroyed, a signal will be developed across rotor 24. This signal will be amplified by amplifier 22 and will cause motor 20 to rotate shafts 36 and 50 in a direction indicated by the arrow in the drawing. Rotation of motor shaft 36 will cause an angular displacement of shaft 40 and receiver rotor 24 through slip coupling 26 against the bias of hair spring 44 in such a direction as to reduce the voltage across rotor 24 until there is just sufficient output from amplifier 22 to keep the motor running at such a speed as to maintain the rotor 24 of the receiver in substantial correspondence with rotor 28 of transmitter 14. There will, however, be a slight angular discrepancy between the rotor 28 of transmitter 14 and rotor 24 of receiver 16, whereby a signal is produced which amplified by amplifier 22 will be just sufficient to maintain the motor running at substantially constant speed against the frictional resistance of bearings of the rotating parts and against the drag exerted by slip coupling 26.

If the flow through line 12 should increase, the vane 30 of flow meter 10 and hence rotor 28 of transmitter 14 will be displaced a corresponding additional amount causing a larger signal to be applied to the motor thereby increasing the speed thereof. This increased speed will cause a corresponding further angular displacement of the output of drag coupling 26, shaft 40 and rotor 24 thereby decreasing the signal supplied to the motor tending to reduce the speed thereof until an equilibrium corresponding to the new position of vane 30 is reached.

If the flow through the line should decrease, hair spring 34 of meter 10 will turn vane 30 counterclockwise to position it in accordance with the new rate of flow. This will also reduce the angular displacement of rotor 28 of transmitter 14 and hence will reduce the signal in receiver 16 with the result that motor 20 will slow down thereby permitting hair spring 44 to reduce the angular displacement of rotor 24 of receiver 16 until a new equilibrium is reached.

From the above discussion, it will be apparent to those skilled in the art that the speed of the motor and the angular displacement of shaft 40 and of rotor 24 of receiver 16 will be directly proportional to the position of vane 30 of flow meter 10 and hence proportional to the rate of flow through line 12.

By integrating this rate of flow over the period of time fuel has been flowing, a measure of the quantity of fuel which has passed through the line will be obtained. As rotation of motor 20 is unidirectional, the total number of revolutions of the motor taken over a period of time will be proportional to the quantity of fluid having flowed through the conduit during the same period of time.

Thus by connecting shaft 40 by a mechanical linkage 52A to indicator 46, the instantaneous rate of flow through the conduit 12 may be read off directly on a scale 54A properly calibrated to compensate for the slight angular discrepancy between rotor 28 of transmitter 14 and rotor 24 of receiver 16. By operating counter 48 from shaft 50 through reduction gears 52, 54 and by properly proportioning the ratio between the gears, the counter will furnish an indication of the fuel consumption.

Counter 48 may also be used as a fuel remaining indicator by setting in the original amount of fuel available, and subtracting therefrom continuously an amount corresponding to the quantity of fuel consumed.

It will be apparent that the angular discrepancy between the rotor of the transmitter and the receiver may be reduced by increasing the sensitivity of amplifier 22. This, however, will in turn increase the tendency of the motor to hunt, and may require means for stabilizing the motor.

Although only one embodiment of the invention has been illustrated and described in detail, it is to be expressly understood that the invention it not limited thereto. Various changes can be made in the design and arrangement of the parts without departing from the spirit and scope of the invention as the same will now be understood by those skilled in the art.

What is claimed is:

1. In a system for metering fluid flow, the combination comprising movable first signal generator means for developing signals corresponding to the rate of fluid flow, movable second signal generator means electrically coupled to said first generator means so that when an error exists between said first and second generator means an error signal is produced, yieldable means for restraining movement of said second signal generator, a slip coupling, a motor coupled to move said second generator means through said slip coupling against said yieldable restraining means in a direction tending to decrease said error signal, means for applying said error signal to said motor for operating said motor in response thereto, and fluid flow indicating means controlled by said motor.

2. In a system for metering fluid flow, a displaceable signal transmitter for transmitting a signal corresponding to the rate of fluid flow, a displaceable signal receiver electrically coupled to said transmitter and adapted to develop an error signal upon positional disagreement of said receiver with said transmitter, yieldable means for restraining movement of said receiver, a slip coupling, a unidirectional motor coupled through said slip coupling to said receiver to displace said receiver toward positional agreement with said transmitter, means interconnecting said receiver and said motor for operating said motor in response to said error signal so that said motor runs continuously at a speed sufficient to maintain said receiver in substantial positional agreement with said transmitter through said slip coupling as long as there is fluid flow, which speed is a function of the rate of fluid flow, and fluid flow indicating means controlled by said motor.

3. In a fuel flow telemetering system, an inductive signal transmitter having a first movable element and adapted to develop signals corresponding to the rate of fuel flow, an inductive signal receiver having a second movable element and electrically coupled to said transmitter to develop an error signal in said second movable element upon positional disagreement between said first and second movable elements, resilient means for restraining movement of said second movable element, a drag coupling, a unidirectional motor connected through said drag coupling to drive said second movable element toward positional agreement with said first movable element to reduce said error signal, means including a signal amplifier interconnecting said second movable element and said motor for operating said motor in response to said error signal at a speed sufficient to maintain said second movable element in substantial positional agreement with said first movable element and at a speed substantially proportional to the rate of fuel flow, means actuated in accordance with the position of said second movable element for indicating the rate of fuel flow, and means including a counter driven by said motor for indicating the amount of fuel consumed.

4. For use in a fluid flow metering system having fluid flow sensing means operable in response to fluid flow, the combination comprising first displaceable signal generator means displaceable by the sensing means for developing signals corresponding to fluid flow, second displaceable signal generator means electrically coupled to said first generator means so that an error signal is produced upon positional disagreement between said first and second generator means, yieldable means for restraining movement of said second generator means, a slip coupling, a motor coupled to displace said second generator means toward positional agreement with said first generator means through said slip coupling against said yieldable restraining means, means for applying said error signal to said motor to operate said motor in response thereto, and fluid flow indicating means controlled by said motor.

5. For use in a fluid flow metering system having fluid flow sensing means displaceable in response to fluid flow, the combination comprising a signal transmitter having a first moveable element displaceable by the sensing means to develop a signal corresponding to the fluid flow, a signal receiver having a second movable element and electrically coupled to said transmitter to develop an error signal upon positional disagreement between said first and second movable elements, yieldable force applying means for restraining movement of said second movable element, a drag coupling, a unidirectional motor coupled through said drag coupling to drive said second movable element toward positional agreement with said first movable element to reduce said error signal, means including a signal amplifier interconnecting said second movable element and said motor for operating said motor in response to said error signal at a speed sufficient to maintain said second movable element in substantial positional agreement with said first movable element and at a speed substantially proportional to the rate of fuel flow, and fluid flow indicating means controlled by said motor.

6. A fluid flow telemetering system comprising fluid flow sensing means displaceable in response to fluid flow, a displaceable signal transmitter in the form of a first inductive coupling device having a rotor displaceable by said sensing means for varying the inductive coupling in said device to produce signals corresponding to fluid flow, a displaceable signal receiver in the form of a second inductive coupling device having a rotor for varying the inductive coupling therein and electrically coupled to said transmitter means for producing an error signal upon positional disagreement between said rotors, yieldable force applying means for biasing the rotor of said receiver, a slip coupling, a motor coupled through said slip coupling to displace the rotor of said receiver toward positional agreement with said transmitter rotor against the bias of said yieldable force applying means, means interconnecting said receiver and said motor for operating said motor in response to said error signal, and fluid flow indicating means controlled by said motor.

7. In a fluid flow telemetering system, displaceable signal transmitter means for producing signals corresponding to the rate of fluid flow, displaceable signal receiver means electrically coupled to said transmitter means and adapted to produce an error signal upon positional disagreement between said receiver and transmitter means, yieldable force applying means for restraining movement of said receiver means, a drag coupling, a motor coupled through said drag coupling to drive said receiver means toward positional agreement with said transmitter means against said yieldable force applying means, means interconnecting said receiver means and said motor for operating said motor in response to said error signal, and fluid flow indicating means controlled by said motor, said fluid flow indicating means comprising means actuated by said drag coupling for indicating the rate of fluid flow.

8. In a fluid flow telemetering system, displaceable signal transmitter means for producing signals corresponding to the rate of fluid flow, displaceable signal receiver means electrically coupled to said transmitter means and adapted to produce an error signal upon positional disagreement between said receiver and transmitter means, yieldable force applying means for restraining movement of said receiver means, a drag coupling, a motor coupled through said drag coupling to drive said receiver means toward positional agreement with said transmitter means against said yieldable force applying means, means interconnecting said receiver means and said motor for operating said motor in response to said error signal, and fluid flow indicating means controlled by said motor, said fluid flow indicating means comprising means including a counter actuated by said motor for providing an indication of fluid flow integrated with respect to time.

References Cited in the file of this patent

UNITED STATES PATENTS

| | | |
|---|---|---|
| 1,451,064 | Dunajeff | Apr. 10, 1923 |
| 1,482,968 | Buckley | Feb. 5, 1924 |
| 1,707,160 | Hodgson | Mar. 26, 1929 |
| 1,780,669 | Bruckel | Nov. 4, 1930 |
| 1,916,737 | Midworth | July 4, 1933 |
| 2,081,364 | Melas | May 25, 1937 |
| 2,098,574 | Doyle | Nov. 9, 1937 |
| 2,269,068 | Corbin | Jan. 6, 1942 |
| 2,361,790 | Noxon | Oct. 31, 1944 |